Patented June 15, 1926.

1,589,331

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

AQUEOUS EMULSION OF UNVULCANIZED RUBBER AND SULPHUR.

No Drawing.   Application filed April 7, 1925. Serial No. 21,340.

This invention relates to aqueous emulsions of unvulcanized rubber and sulphur. One object of the invention is to provide an improved emulsion of this character suitable for electrodeposition by the process disclosed in our U. S. Patent No. 1,476,374, granted Dec. 4, 1923, for electrodeposition of rubber coatings. Another object of the invention is to provide such an emulsion in which the sulphur is held in suspension with especial firmness, so that it may be added in relatively large quantities and yet will enter the electrodeposited coating with the rubber. Another object is to provide a process for making such emulsions. Other objects will hereinafter appear.

We have found that unvulcanized rubber and sulphur may be associated together in an electrodepositable aqueous emulsion especially well by means of a protective colloid, preferably of a gelatinous nature. We shall now describe one specific embodiment of our invention by way of illustration, but it will be understood that our invention is not limited thereto nor to the details thereof, except as indicated in the appended claims.

To an aqueous rubber emulsion, such as one prepared in accordance with our above cited patent, or a natural one, such as rubber latex, preferably made stable by an alkaline agent, such as ammonia, we add an aqueous emulsion of sulphur containing the protective colloid. We may, for example, prepare an aqueous solution of gum arabic or gelatin or glue having a concentration of about ½%. Into this we disperse the sulphur, say 20%. This dispersing may be accomplished by any of the means known in this art, such as by precipitation or agitation. One convenient way is to mix the sulphur into said solution in finely divided form, like flowers of sulphur, and then pass the mixture through a high-speed colloid mill of any of the types now on the market.

The aqueous emulsion of sulphur and colloid is then thoroughly mixed with the aqueous emulsion of unvulcanized rubber. For example, we may add 1000 cc. of the above described sulphur emulsion to 4000 cc. of rubber latex, preferably one having about 30% concentration of rubber. The latex may be sufficiently alkaline to prevent coagulation, or the sulphur solution may be made slightly alkaline, say with ammonia before it is stirred into the latex. Similar proportions and expedients are employed when the sulphur-colloid emulsion is incorporated in the emulsion of unvulcanized rubber disclosed in our above cited patent.

The protective colloid may be worked into the rubber emulsion by addition of one or more pigments. Thus we may mix 4% carbon-black in an aqueous solution containing ½ of a per cent of colloid such as glue, the mixture being homogenized by intensive agitation, say in one of the known colloid mills. The emulsion thus produced is then mixed into a rubber emulsion, such as the latex above described and the combination homogenized in a suitable mill. We may employ, for example, 3000 parts by volume of the carbonblack-colloid emulsion to 4000 parts of the 30% rubber emulsion or latex. Where a white pigment is desired, we may mix 20% of zinc oxide in a ½% solution of glue and homogenize to get a stable emulsion, which is then incorporated with the latex or emulsion of unvulcanized rubber in a way similar to that hereinabove described. Similarly, nigrosine can be emulsified with a colloid and added.

The method is also applicable to the incorporation of diphenyl guanidine, as an accelerator of vulcanization. Thus we prepare an 8% suspension of this substance in water and mix it with the rubber emulsion or latex, in the proportion of 1000 parts by volume of the former to 4000 parts of the latex.

While we may add any of the above mentioned emulsions containing the colloid to the rubber emulsion and homogenize the mixture, with suitable low-speed mills, we may also simultaneously add any two or more of them. In fact, in the preferred form of our invention we add to the rubber emulsion or latex all of the ingredients hereinabove described in the proportions stated, thus obtaining an emulsion of unvulcanized rubber carrying sulphur, diphenyl guanidine, carbonblack, nigrosine and zinc oxide together with the gelatinous colloid.

The hereinabove described emulsions may all be utilized in the process of electrodeposition described in our above cited patent. The conditions there given, namely,—the use of 110 volts and a current density of ⅓ of an ampere per square inch to be plated, are satisfactory.

Having thus described our invention, what we claim as new and desire to secure by Letters Patent is:

1. An aqueous emulsion comprising in the disperse phase electrodepositable unvulcanized rubber, vulcanizing material, and an organic protective colloid, swellable in water.

2. An aqueous emulsion comprising in the disperse phase electrodepositable unvulcanized rubber, sulphur, and an organic protective colloid, swellable in water.

3. An aqueous emulsion comprising in the disperse phase electrodepositable unvulcanized rubber, vulcanizing material, and a gelatinous protective colloid.

4. An aqueous emulsion comprising in the disperse phase electrodepositable unvulcanized rubber, sulphur, and glue.

5. An aqueous emulsion comprising in the disperse phase electrodepositable unvulcanized rubber, vulcanizing material, coloring matter, and an organic protective colloid, swellable in water.

6. The process of preparing an aqueous emulsion containing in the disperse phase electrodepositable unvulcanized rubber, vulcanizing material, and a protective colloid, which comprises the steps of mixing an aqueous emulsion of unvulcanized rubber with an aqueous emulsion of vulcanizing material, in the presence of a protective colloid and subjecting the mixture to agitation until homogenized.

7. The process of preparing an aqueous emulsion comprising in the disperse phase electrodepositable unvulcanized rubber, sulphur, and a protective colloid, which comprises the steps of mixing an aqueous emulsion of rubber and an aqueous emulsion of sulphur in the presence of a protective colloid, and then subjecting the mixture to agitation until the emulsion is homogenized.

8. The process of preparing an aqueous emulsion containing in the disperse phase electrodepositable rubber, and a plurality of substances which cooperate with the rubber in an electrodeposited coating made from said emulsion, which comprises the steps of preparing a plurality of separate aqueous emulsions of said unvulcanized rubber and said substances, mixing said aqueous emulsions together, and subjecting the mixture to agitation until a stable mixed emulsion is obtained.

Signed at Rochester New York this 2nd day of April, 1925.

SAMUEL E. SHEPPARD.
LEON W. EBERLIN.